United States Patent
Tiefensee et al.

[11] Patent Number: 5,969,042
[45] Date of Patent: Oct. 19, 1999

[54] TRANSPARENT MOLDING MATERIALS RESISTANT TO STRESS CRACKING AND HAVING IMPROVED TOUGHNESS/RIGIDITY RATIO

[75] Inventors: Kristin Tiefensee, Westheim; Norbert Güntherberg, Speyer, both of Germany

[73] Assignee: BASF Aktiengesellschaft, Ludwigshafen, Germany

[21] Appl. No.: 08/983,233

[22] PCT Filed: Jul. 12, 1996

[86] PCT No.: PCT/EP96/03072
§ 371 Date: Jan. 13, 1998
§ 102(e) Date: Jan. 13, 1998

[87] PCT Pub. No.: WO97/05198
PCT Pub. Date: Feb. 13, 1997

[30] Foreign Application Priority Data
Jul. 28, 1995 [DE] Germany ............ 195 27 579

[51] Int. Cl.⁶ ............ C08L 51/04; C08L 33/12; C08L 25/12
[52] U.S. Cl. ............ 525/83; 525/84; 525/227; 525/230; 525/238; 525/310
[58] Field of Search ............ 525/83, 84, 227, 525/230, 238, 310

[56] References Cited

U.S. PATENT DOCUMENTS

| | | |
|---|---|---|
| 3,509,237 | 4/1970 | Aubrey . |
| 3,663,656 | 5/1972 | Ford et al. . |
| 4,393,164 | 7/1983 | McKee et al. . |
| 4,524,180 | 6/1985 | Sun ............ 525/71 |
| 4,897,449 | 1/1990 | Gaillard et al. ............ 525/85 |
| 4,914,144 | 4/1990 | Muehlbach et al. ............ 524/139 |
| 5,414,045 | 5/1995 | Sue et al. ............ 525/86 |
| 5,457,157 | 10/1995 | Deckers et al. ............ 525/80 |
| 5,576,385 | 11/1996 | Tiefensee et al. ............ 525/77 |

FOREIGN PATENT DOCUMENTS

| | | |
|---|---|---|
| 347 726 | 12/1989 | European Pat. Off. . |
| 603 674 | 6/1994 | European Pat. Off. . |
| 1 472 195 | 5/1977 | United Kingdom . |
| 2 156 365 | 10/1985 | United Kingdom . |

OTHER PUBLICATIONS

Vol. 1, Acrylonitrile–Butadine Styrene Polymers, 401–425, Ency. Of Poly. Sci.and Eng.
W. Scholtan et al., Polymere 250, 1972, pp. 782–796.

*Primary Examiner*—Jeffrey C. Mullis
*Attorney, Agent, or Firm*—Keil & Weinkauf

[57] ABSTRACT

Thermoplastic molding materials contain a mixture of
(A) a methacrylate polymer,
(B) a copolymer of vinylaromatic monomers and vinyl cyanide,
(C) a graft copolymer comprising a core and a graft shell and
(D) a further graft copolymer comprising a core and a graft shell, the average particle size $(d_{50})$-C of the graft copolymer (C) being from 25 to 60 nm and that of the graft copolymer (D) being from 90 to 300 nm and the ratio of the average particle size $(d_{50})$-C to $(d_{50})$-D being kept in the range from 2:1 to 5:1.

7 Claims, No Drawings

TRANSPARENT MOLDING MATERIALS RESISTANT TO STRESS CRACKING AND HAVING IMPROVED TOUGHNESS/RIGIDITY RATIO

The present invention relates to thermoplastic molding materials containing a mixture of
- (A) from 15 to 70% by weight of a methacrylate polymer obtainable by polymerization of a mixture consisting of
  - (A1) from 90 to 100% by weight, based on (A), of methyl methacrylate and
  - (A2) from 0 to 10% by weight, based on (A), of a $C_1$–$C_8$-alkyl ester of acrylic acid and
- (B) from 10 to 50% by weight of a copolymer obtainable by polymerization of a mixture consisting of
  - (B1) from 78 to 88% by weight, based on (B), of a vinyl-aromatic monomer and
  - (B2) from 12 to 22% by weight, based on (B), of a vinyl cyanide and
- (C) from 18 to 35% by weight of a graft copolymer (C) obtainable from
  - (C1) from 50 to 80% by weight of a core obtainable by polymerization of a monomer mixture consisting of
    - (C11) from 50 to 100% by weight of a 1,3-diene and
    - (C12) from 0 to 50% by weight of a vinylaromatic monomer and
  - (C2) from 20 to 50% by weight of a graft shell obtainable by polymerization of a monomer mixture in the presence of the core (C1), consisting of
    - (C21) from 40 to 100% by weight of a $C_1$–$C_8$-alkyl ester of methacrylic or acrylic acid and
    - (C22) from 0 to 60% by weight of a vinylaromatic monomer,
    having an average particle size $(d_{50})$-C of the graft copolymer (C) of from 25 to 60 nm, and
- (D) from 2 to 15% by weight of a graft copolymer (D) obtainable from
  - (D1) from 50 to 80% by weight of a core obtainable by polymerization of a monomer mixture consisting of
    - (D11) from 50 to 100% by weight of a 1,3-diene and
    - (D12) from 0 to 50% by weight of a vinylaromatic monomer and
  - (D2) from 20 to 50% by weight of a graft shell comprising
    - (D21) from 40 to 100% by weight of a $C_1$–$C_8$-alkyl ester of methacrylic or acrylic acid and
    - (D22) from 0 to 60% by weight of a vinylaromatic monomer,
    having an average particle size $(d_{50})$-D of the graft copolymer (D) of from 90 to 300 nm, and with the further proviso that the ratio of the average particle sizes $(d_{50})$-C to $(d_{50})$-D is kept in the range from 2:1 to 5:1, and
- (E) if required, conventional additives in amounts of up to 20% by weight, based on the sum of the components A, B, C and D, the percentages by weight of A, B, C and D summing to 100 and the difference between the refractive index of the components C and D and that of the mixture of the components A, B and, if required, E being less than 0.005.

The present invention furthermore relates to a process for the preparation of the novel thermoplastic molding materials, their use and the moldings obtainable therefrom.

EP-A 62 223 describes highly glossy, transparent, impact-resistant, thermoplastic molding materials comprising a hard methyl methacrylate polymer, a hard styrene/acrylonitrile polymer and a soft graft copolymer of alkyl (meth)acrylate and, if required, styrene on a rubber. The molding materials contain core/shell particles having a particle size of less than 0.2 μm for improving the impact strength.

However, the toughness/rigidity ratio of such thermoplastic molding materials is still insufficient for some applications, in particular in the cosmetics sector. For various molding materials in the cosmetics sector, it is in fact necessary to have a material which is resistant to stress cracking and which, in addition to high transparency, also possesses a balanced toughness/rigidity ratio.

One possible method for increasing the impact strength of thermoplastic polymers is to chemically agglomerate a graft copolymer used as a modifier with the aid of a latex comprising a copolymer of ethyl acrylate and methacrylic acid (EP-A 347 726). An increase in the average particle diameter from 90 nm to 200–600 nm is observed. The disadvantage of this chemical agglomeration is the broad particle size distribution of the agglomerated fraction, which may lead to opacity and to yellowing of the polymer after grafting of the partly agglomerated latex. In addition, it is very difficult exactly to establish the agglomerated fraction.

Furthermore, GB-A 2 156 365 discloses that the impact strength of thermoplastic polymers can be increased by agglomerating said polymers with the aid of metal salts. However, this may result in salt occlusions in the polymer, which adversely affect its transparency.

It is an object of the present invention to remedy the disadvantages described and to provide improved transparent molding materials which are resistant to stress cracking and have high impact strength and in addition good optical properties.

We have found that this object is achieved by the thermoplastic molding materials defined at the outset.

We have also found a process for their preparation, their use for the production of moldings, and moldings produced from the novel thermoplastic molding materials.

The novel thermoplastic molding materials contain
- (A) from 15 to 70, preferably from 25 to 60, % by weight of a methacrylate polymer obtainable by polymerization of a mixture consisting of
  - (A1) from 90 to 100, preferably from 93 to 97, % by weight, based on (A), of methyl methacrylate and
  - (A2) from 0 to 10, preferably from 3 to 7, % by weight, based on (A), of a $C_1$–$C_8$-alkyl ester of acrylic acid,
- (B) from 10 to 50, preferably from 10 to 40, % by weight of a copolymer obtainable by polymerization of a mixture consisting of
  - (B1) from 78 to 88, preferably from 78 to 84, % by weight, based on (B), of a vinylaromatic monomer and
  - (B2) from 12 to 22, preferably from 16 to 22, % by weight, based on (B), of a vinyl cyanide and
- (C) from 18 to 35, preferably from 20 to 30, % by weight of a graft copolymer obtainable from
  - (C1) from 50 to 80, preferably from 55 to 70, % by weight of a core obtainable by polymerization of a monomer mixture consisting of
    - (C11) from 50 to 100, preferably from 60 to 80, % by weight of a 1,3-diene and
    - (C12) from 0 to 50, preferably from 20 to 40, % by weight of a vinylaromatic monomer and
  - (C2) from 20 to 50, preferably from 30 to 45, % by weight of a graft shell obtainable by polymerization of a monomer mixture in the presence of the core (C1), consisting of
    - (C21) from 40 to 100, preferably from 50 to 80, % by weight of a $C_1$–$C_8$-alkyl ester of methacrylic or acrylic acid and (C22) from 0 to 60, preferably from 20 to 50, % by weight of a vinylaromatic monomer,
having an average particle size $(d_{50})$-C of the graft copolymer (C) of from 25 to 60 nm, in particular from 30 to 55 nm, particularly preferably from 35 to 55 nm, and (D) from 2 to 15, preferably from 4 to 10, % by weight of a graft copolymer (D) obtainable from
(D1) from 50 to 80, preferably from 55 to 70, % by weight of a core obtainable by polymerization of a monomer mixture consisting of
(D11) from 50 to 100, preferably from 60 to 80, % by weight of a 1,3-diene and
(D12) from 0 to 50, preferably from 20 to 40, % by weight of a vinylaromatic monomer and
(D2) from 20 to 50, preferably from 30 to 45, % by weight of a graft shell obtainable by polymerization of a monomer in the presence of a core (D1) consisting of
(D21) from 40 to 100, preferably from 50 to 80, % by weight of a $C_1$–$C_8$-alkyl ester of methacrylic or acrylic acid and
(D22) from 0 to 60, preferably from 20 to 50, % by weight of a vinylaromatic monomer,
having an average particle size $(d_{50})$-D of the graft copolymer (D) of from 90 to 300 nm, in particular of 100 to 250 nm, particularly preferably from 120 to 200 nm, and with the further proviso that the ratio of the average particle sizes $(d_{50})$-C of the graft copolymer (C) to the average particle sizes $(d_{50})$-D of the graft copolymer (D) is kept in the range from 2:1 to 5:1, in particular from 3:1 to 5:1, and (E) if required, conventional additives in amounts of up to 20, preferably from 0 to 10, % by weight, based on the sum of the components A, B, C and D, the stated percentages by weight of A, B, C and D summing to 100 and the difference between the refractive index of the components C and D and that of the mixture of the components A, B and, if required, E being less than 0.005.

The methacrylate polymers (A) are either homopolymers of methyl methacrylate (MMA) or copolymers of MMA with up to 10% by weight, based on (A), of a $C_1$–$C_8$-alkyl ester of acrylic acid.

Methyl acrylate, ethyl acrylate, propyl acrylate, n-butyl acrylate, n-pentyl acrylate, n-hexyl acrylate, n-heptyl acrylate, n-octyl acrylate and 2-ethylhexyl acrylate and mixtures thereof may be used as $C_1$–$C_8$-alkyl esters of acrylic acid (component A2), preferably methyl acrylate, n-butyl acrylate and 2-ethylhexyl acrylate or mixtures thereof, particularly preferably methyl acrylate.

The methyl methacrylate (MMA) polymers can be prepared by mass, solution or bead polymerization by known methods (cf. for example Kunststoff-Handbuch, Volume IX, Polymethacrylate, Vieweg/Esser, Carl-Hanser-Verlag 1975) and are commercially available. Methacrylate polymers whose weight average molecular weights $M_w$ are from 60,000 to 300,000 (determined by light scattering in chloroform) are preferably used.

The component (B) is a copolymer of a vinylaromatic monomer (B1) and vinyl cyanide (B2).

Styrene, styrene which is monosubstituted to trisubstituted by $C_1$–$C_8$-alkyl, such as p-methylstyrene or tert-butylstyrene, and α-methylstyrene may be used as vinylaromatic monomers (component B1), styrene being preferably employed.

Acrylonitrile and/or methacrylonitrile may be used as the vinyl cyanide (component B2), acrylonitrile being preferably employed.

Outside the abovementioned range of the composition of the component (B), opaque molding materials which have joint seams are usually obtained at processing temperatures above 240° C.

The copolymers (B) can be prepared by all known methods, for example by mass, solution, suspension or emulsion polymerization, preferably by solution polymerization (cf. GB-A 14 72 195). Copolymers (B) having weight average molecular weights $M_w$ of from 60,000 to 300,000, determined by light scattering in dimethylformamide, are preferred.

A graft copolymer comprising a core (C1) and a graft shell (C2) applied thereon is used as component (C).

The core (C1) is the grafting base and has a swelling index Q1 of from 15 to 35%, in particular from 20 to 30%, determined by measurement of the swelling in toluene at room temperature.

Butadiene and/or isoprene may be used as the 1,3-diene (component C11) of the core of the copolymer (component C1).

Styrene or a styrene substituted in the α-position or preferably on the nucleus by a $C_1$–$C_8$-alkyl group (or by a plurality of such groups on the nucleus), preferably methyl, may be used as the vinylaromatic monomer (component C12).

The core of the graft copolymer preferably has a glass transition temperature of less than 0° C. and preferably has an average particle size of less than 200 nm, particularly preferably from 30 to 150 nm. Usually, the core is prepared by emulsion polymerization (cf. for example Encyclopedia of Polymer Science and Engineering, Vol. 1, page 401 et seq.).

The graft shell (C2) which contains the monomers (C21) and, if required, (C22) is applied to the core (C1).

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methylacrylate or 2-ethylhexyl methacrylate, particularly preferably methyl methacrylate, and mixtures of these monomers, methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably n-butyl acrylate, and mixtures of these monomers with one another and with the methacrylates are used as $C_1$–$C_8$-alkyl esters of methacrylic or acrylic acid (component C21).

Styrene, styrene which is monosubstituted to trisubstituted by $C_1$–$C_8$-alkyl, such as p-methylstyrene and tert-butylstyrene, and α-methylstyrene may be used as vinylaromatic monomers (component C22), styrene being preferably employed.

When more than one monomer is used for the graft shell, a shell morphology may be desirable. The various shells may have different compositions. This is achieved in general by adding different monomers (monomer mixtures) at different times during the polymerization.

The graft shell (C2) is usually prepared in the presence of the core (C1), for example by the process described in Encyclopedia of Polymer Science and Engineering, Vol. 1, page 401 et seq.

The graft copolymer (C) can be isolated, for example, by spray-drying or by coagulation. Such products are commercially available and preferably have an average particle size $(d_{50})$-C of from 25 to 60 nm, particularly preferably from 30 to 55 nm.

A graft copolymer comprising a core (D1) and a graft shell (D$_2$) applied thereon may likewise be used as component (D).

The component (D) contains comonomers which belong to the same classes of compounds as the comonomers used in the graft copolymer (C), so that reference may be made to our explanations of component (C) with regard to their preparation and their exact composition.

The graft copolymer (D) may likewise be isolated by spray-drying or by coagulation. Such products are commercially available and have an average particle size (d$_{50}$)-D of from 90 to 300 nm, preferably from 100 to 250 nm, in particular from 120 to 200 nm.

The components (C) and (D) may each contain identical or different comonomers within the indicated classes of compounds. Their swelling indices, determined in toluene, are from 10 to 30, preferably from 12 to 20. The gel content of the components (C) and (D), determined by swelling in toluene, is from 85 to 92%, preferably from 88 to 92%.

Preferred additives (E) are those which dissolve in the components A and B to give a clear solution. Examples are dyes, stabilizers, lubricants and antistatic agents.

The mixing of the components A, B, C, D and, if desired, E is usually carried out in the melt at from 200 to 300° C., preferably from 220 to 280° C.

A precondition for the transparency of the novel molding materials is that the difference between the refractive index of the (soft) components C and D and that of the mixture of the (hard) components A and B and, if required, of the fillers E is less than 0.005. The refractive index of the mixture of the hard components A, B and, if required, E is obtained by linear combination of the refractive indices of the individual components with their weight fractions. For a given refractive index of the soft components C and D, the refractive index of the hard component is matched up by a suitable choice of the ratio (A+E):B. A further essential precondition for the independence of the transparency of the processing temperature is adherence to the stated composition of the individual components and compatibility of the individual vidual components with one another.

The novel molding materials can be converted into shaped articles, mainly by injection molding or blow molding. The molding materials may also be compression molded, calendered, extruded or vacuum formed. They may be used wherever a material which is resistant to stress cracking and has high transparency and a balanced toughness/rigidity ratio is required, for example in the cosmetics sector.

The processing range of the novel, transparent, thermoplastic molding materials above 200° C. is not limited by incompatibility phenomena. The mixtures can be processed at from 200 to 300° C. without loss of transparency, without marked yellowing and without troublesome odor. Injection molded parts show no joint seam marks at all and are distinguished, inter alia, by high transparency. The novel thermoplastic molding materials furthermore have great toughness in combination with good rigidity and good optical properties.

EXAMPLES

In the examples and comparative experiments which follow, ratios and percentages are by weight.

The refractive index $n_D^{25}$ was determined using an Abbé refractometer by the method for measuring the refractive indices of solids (cf. Ullmanns Encyklopädie der technischen Chemie, Volume 2/1, page 486, editor E. Foerst; Urban & Schwarzenberg, Munich-Berlin 1961).

The multiaxial toughness Wg was determined according to DIN 53 443 and the rigidity (modulus of elasticity) according to DIN 53 475.

The average particle size (d$_{50}$)-C or (d$_{50}$)-D and the particle size distribution were determined from the integral mass distribution. The average particle sizes in all cases are the weight average of the particle sizes as determined by means of an analytical ultracentrifuge according to the method of W. Scholtan and H. Lange, Kolloid-Z, and Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The average particle diameter, which is also referred to as the d$_{50}$ value of the integral mass distribution, is defined as the particle diameter at which 50% by weight of the particles have a diameter smaller than the diameter which corresponds to the d$_{50}$ value. Likewise, 50% by weight of the particles then have a larger diameter than the d$_{50}$ value.

The yellowness index YI is based on chromaticity coordinates calculated from the transmission spectrum according to DIN 5036. The illuminant D65 and the standard widefield observer form the base.

The determination of the scattered light fraction was likewise carried out according to DIN 5036.

The Example and Comparative Examples A to D, the polymers defined in more detail below were used:

A Copolymer prepared from methyl methacrylate (MMA) and methyl acrylate (MA) in the ratio of 94:6 ($n_D^{25}$= 1.492, M$_w$=110,000 g/mol);

B Copolymer prepared from styrene (S) and acrylonitrile (AN) in the ratio of 81:19 (M$_w$=250,000 g/mol, $n_D^{25}$= 1.575);

C Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerization of 72 parts by weight of butadiene and 28 parts by weight of styrene ($n_D^{25}$=1.5402, d$_{50-C}$=110 nm);

C$^1$ Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerization of 72 parts by weight of butadiene and 28 parts by weight of styrene ($n_D^{25}$=1.5402, d$_{50-C}$=53 nm);

D$^1$ Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerization of 72 parts by weight of butadiene and 28 parts by weight of styrene ($n_D^{25}$=1.5402, d$_{50-C}$=195 nm);

D$^2$ Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerization of 72 parts by weight of butadiene and 28 parts by weight of styrene ($n_D^{25}$=1.5402, d$_{50-C}$=100 nm);

D$^3$ Graft copolymer prepared from 45 parts by weight of a mixture consisting of 51 parts by weight of MMA, 44 parts by weight of styrene and 5 parts by weight of n-butyl acrylate, polymerized in the presence of 55 parts by weight of a core obtainable by polymerization of 72 parts by weight of butadiene and 28 parts by weight of styrene ($n_D^{25}$=1.5402, d$_{50-C}$=310 nm).

TABLE

| | Components [in % by weight] | | | | Ratio of particle sizes | Impact strength | Rigidity [modulus | Yellowness index | Scattered light fraction |
|---|---|---|---|---|---|---|---|---|---|
| | A | B | C | D | $d_{50}$-C/$d_{50}$-D | [Wg] | of elasticity] | [YI] | [%] |
| Comparative Example A | A[28.5] | B[35.5] | C[36.0] | — | — | 12.4 | 1970 | 4.9 | 3.8 |
| Example | A[28.5] | B[35.5] | C¹[28.8] | D¹[7.2] | 3.7 | 19.8 | 2000 | 2.5 | 2.9 |
| Comparative Example B | A[28.5] | B[35.5] | C¹[28.8] | D²[7.2] | 1.9 | 6.2 | 2010 | 3.7 | 3.5 |
| Comparative Example C | A[28.5] | B[35.5] | C¹[28.8] | D³[7.2] | 5.8 | 21.1 | 1950 | 4.0 | 5.3 |

A comparison of the example according to the invention with Comparative Examples A to C shows, inter alia, that the novel use of graft copolymers C and D having exactly defined average particle sizes $d_{50\text{-}C}$ and $d_{50\text{-}D}$ and a specific ratio of the particle sizes $d_{50\text{-}C}/d_{50\text{-}D}$ leads to molding materials exhibiting less yellowing and high transparency [smaller scattered light fraction]. Moreover, the novel thermoplastic molding materials are distinguished by an improved toughness/rigidity ratio.

We claim:

1. A thermoplastic molding material containing a mixture of
   (A) from 15 to 70% by weight of a methacrylate polymer obtainable by polymerization of a mixture consisting of
      (A1) from 90 to 100% by weight, based on (A), of methyl methacrylate and
      (A2) from 0 to 10% by weight, based on (A), of a $C_1$–$C_8$-alkyl ester of acrylic acid and
   (B) from 10 to 50% by weight of a copolymer obtainable by polymerization of a mixture consisting of
      (B1) from 78 to 88% by weight, based on (B), of a vinylaromatic aromatic monomer and
      (B2) from 12 to 22% by weight, based on (B), of a vinyl cyanide and
   (C) from 18 to 35% by weight of a graft copolymer (C) obtainable from
      (C1) from 50 to 80% by weight of a core obtainable by polymerization of a monomer mixture consisting of
         (C11) from 50 to 100% by weight of a 1,3-diene and
         (C12) from 0 to 50% by weight of a vinylaromatic monomer and
      (C2) from 20 to 50% by weight of a graft shell obtainable by polymerization of a monomer mixture in the presence of the core (C1), consisting of
         (C21) from 40 to 100% by weight of a $C_1$–$C_8$-alkyl ester of methacrylic or acrylic acid and
         (C22) from 0 to 60% by weight of a vinylaromatic monomer,
      having an average particle size ($d_{50}$)-C of the graft copolymer (C) of from 25 to 60 nm, and
   (D) from 2 to 15% by weight of a graft copolymer (D) obtainable from
      (D1) from 50 to 80% by weight of a core obtainable by polymerization of a monomer mixture consisting of
         (D11) from 50 to 100% by weight of a 1,3-diene and
         (D12) from 0 to 50% by weight of a vinylaromatic monomer and
      (D2) from 20 to 50% by weight of a graft shell comprising
         (D21) from 40 to 100% by weight of a $C_1$–$C_8$-alkyl ester of methacrylic or acrylic acid and
         (D22) from 0 to 60% by weight of a vinylaromatic monomer,
      having an average particle size ($d_{50}$)-D of the graft copolymer (D) of from 90 to 300 nm, and with the further proviso that the ratio of the average particle sizes ($d_{50}$)-C to ($d_{50}$)-D is kept in the range from 2:1 to 5:1, and
   (E) optionally, conventional additives E1 in amounts of up to 20% by weight, based on the sum of the components A, B, C and D, the percentages by weight of A, B, C and D summing to 100 and the difference between the refractive index of the components C and D and that of the mixture of the components A, B and, if present, E1 being less than 0.005.

2. A thermoplastic molding material as claimed in claim 1, wherein the graft copolymer (C) has an average particle size ($d_{50}$)-C of from 30 to 55 nm.

3. A thermoplastic molding material as claimed in claim 1, wherein the graft copolymer (D) has an average particle size ($d_{50}$)-D of from 100 to 250 nm.

4. A thermoplastic molding material as claimed in claim 1, wherein the ratio of the average particle sizes ($d_{50}$)-C to ($d_{50}$)-D is kept in the range from 3:1 to 5:1.

5. A process for the preparation of a thermoplastic molding material as claimed in claim 1, wherein
   (A) from 15 to 70% by weight of a methacrylate polymer obtainable by polymerization of a mixture consisting of
      (A1) from 90 to 100% by weight, based on (A), of methyl methacrylate and
      (A2) from 0 to 10% by weight, based on (A), of a $C_1$–$C_8$-alkyl ester of acrylic acid and
   (B) from 10 to 50% by weight of a copolymer obtainable by polymerization of a mixture consisting of
      (B1) from 78 to 88% by weight, based on (B), of a vinylaromatic monomer and
      (B2) from 12 to 22% by weight, based on (B), of a vinyl cyanide and
   (C) from 18 to 35% by weight of a graft copolymer (C) obtainable from
      (C1) from 50 to 80% by weight of a core obtainable by polymerization of a monomer mixture consisting of
         (C11) from 50 to 100% by weight of a 1,3-diene and
         (C12) from 0 to 50% by weight of a vinylaromatic monomer and
      (C2) from 20 to 50% by weight of a graft shell obtainable by polymerization of a monomer mixture in the presence of the core (C1), consisting of
         (C21) from 40 to 100% by weight of a $C_1$–$C_8$-alkyl ester of methacrylic or acrylic acid and
         (C22) from 0 to 60% by weight of a vinylaromatic monomer, having an average particle size ($d_{50}$)-C of the graft copolymer (C) of from 25 to 60 nm, and (D) from 2 to 15% by weight of a graft copolymer (D) obtainable from
- (D1) from 50 to 80% by weight of a core obtainable by polymerization of a monomer mixture consisting of
  - (D11) from 50 to 100% by weight of a 1,3-diene and
  - (D12) from 0 to 50% by weight of a vinylaromatic monomer and
- (D2) from 20 to 50% by weight of a graft shell comprising
  - (D21) from 40 to 100% by weight of a $C_1$–$C_8$-alkyl ester of methacrylic or acrylic acid and
  - (D22) from 0 to 60% by weight of a vinylaromatic monomer, having an average particle size ($d_{50}$)-D of the graft copolymer (D) of from 90 to 300 nm, and with the further proviso that the ratio of the average particle sizes ($d_{50}$)-C to ($d_{50}$)-D is kept in the range from 2:1 to 5:1, and (E) optionally, conventional additives E1 in amounts of up to 20% by weight, based on the sum of the components A, B, C and D, the percentages by weight of A, B, C and D summing to 100 and the difference between the refractive index of the components C and D and that of the mixture of the components A, B and, if present, E1 being less than 0.005, are mixed at from 200 to 300° C.

6. Process in which the thermoplastic molding material as claimed in claim 1 is molded.

7. A molding obtainable by the process of claim 6.

* * * * *

UNITED STATES PATENT AND TRADEMARK OFFICE
CERTIFICATE OF CORRECTION

PATENT NO. : 5,969,042
DATED : October 19, 1999
INVENTOR(S) : Tienfensee et al.

It is certified that error appears in the above-identified patent and that said Letters Patent is hereby corrected as shown below:

Claim 6, should read as follows:

-- 6. A method for making a molding wherein the thermoplastic molding material as claimed in claim 1 is compression molded, calendered, extruded or vacuum formed, or is converted into a shaped article by injection molding or blow molding. --

Signed and Sealed this

Twentieth Day of November, 2001

*Attest:*

*Attesting Officer*

NICHOLAS P. GODICI
*Acting Director of the United States Patent and Trademark Office*